United States Patent [11] 3,604,331

[72] Inventors John Barron Carberry
Parlin;
Abraham Bernard Cohen, Springfield;
Robert Bernard Heiart, Middletown, all of, N.J.
[21] Appl. No. 656,106
[22] Filed July 26, 1967
[45] Patented Sept. 14, 1971
[73] Assignee E. I. du Pont de Nemours and Company Wilmington, Del.

[54] MACHINE FOR DEVELOPING RESIST IMAGES
2 Claims, 6 Drawing Figs.

[52] U.S. Cl. 95/89 R
[51] Int. Cl. G03d 3/06
[50] Field of Search 95/89, 95, 96, 97, 98, 99

[56] References Cited

UNITED STATES PATENTS 3,528,358 9/1970 Pickard ........ 95/89
3,000,288 9/1961 Winnek ........ 95/89
3,088,391 5/1963 Sigler ........ 95/89 X
3,166,999 1/1965 Dement ........ 95/95

FOREIGN PATENTS 1,178,707 9/1964 Germany ........ 95/89

*Primary Examiner*—Samuel S. Matthews
*Assistant Examiner*—Fred L. Braun
*Attorney*—Lynn Barratt Morris

ABSTRACT: A machine for developing resist images having an initial spray chamber where an exposed photosensitive element is suspended, sprays in said chamber adapted to apply developer solution to said element, a final spray chamber where the developed element is suspended, and sprays in said final spray chamber adapted to apply a washing solution to the developed element. The machine has a mechanism for recycling the developer solution and metering device for supplying the washing solution. The machine is useful for developing and washing exposed photopolymerizable plates, e.g., those used for printed circuits.

PATENTED SEP 14 1971 3,604,331

INVENTORS
JOHN BARRON CARBERRY
ABRAHAM BERNARD COHEN
ROBERT BERNARD HEIART

BY Lynn Barratt Morris
ATTORNEY

INVENTORS
JOHN BARRON CARBERRY
ABRAHAM BERNARD COHEN
ROBERT BERNARD HEIART
BY Lynn Barratt Morris
ATTORNEY INVENTORS
JOHN BARRON CARBERRY
ABRAHAM BERNARD COHEN
ROBERT BERNARD HEIART
BY Lynn Barratt Morris
ATTORNEY

MACHINE FOR DEVELOPING RESIST IMAGES

BACKGROUND OF THE INVENTION

1. Field of the Invention

A machine for developing resist images on photosensitive plates having photosensitive, e.g., photosoluble or photopolymerizable layers on a support, for instance, resist images for printed circuits.

2. Description of the Prior Art

Organic solvent development of photoresist images is known, and machines are available for developing such images with organic solvent vapor and/or liquid. Machines which develop the images in a liquid, however, all require either frequent discard of the solvent or large capacity rectifying equipment. The former is wasteful of material, and the latter involves bulky, expensive installations. Vapor degreasing machines have been used to develop photoresists either in hot solvent vapor alone or in solvent vapor combined with a rinse in hot solvent. Vapor degreasing machines, however, are only practical for use with solvents which have a high vapor density, and operate only with hot vapor and solvent. This severely limits both the type of solvent and the composition of photoresist materials which can be employed. In addition, vapor degreasing machines which include sprays have them situated in the same chamber as the hot solvent vapor which limits the usefulness still further.

The machine of this invention operates with a relatively small total volume of solvent of which only a portion is rectified in compact inexpensive equipment. Since the major portion of the soluble material is removed in a small volume of recirculating solvent with a relatively stable concentration of dissolved material, uniform development of successive plates can be obtained with economies in solvent and equipment.

*Levy* 1,166,378 relates to an etching apparatus in which a horizontally maintained shaft rotates a plate carried in a casing supplied with means for spraying fluid in the casing onto the plate. Means are provided for spraying etching fluid and water alternatively.

*Mayer* 2,404,138 relates to apparatus for developing exposed photographic prints embodying means for spraying developer and fixer solutions onto a moving perforated belt that carries the prints. It is provided with recycling means for the solutions.

*Wiswall* 2,471,506 relates to a spray washing machine for solid objects having a washing chamber that is provided with spray nozzles, drains, circulating pumps, and a series of liquid containers below the chamber and three-way valves in the supply lines from the chambers.

SUMMARY OF THE INVENTION

The machine for developing resist images on etchable sheets or plates comprises (1) a frame, (2) a chamber in which the latent image-bearing sheets or plates are suspended, (3) means for spraying a surface of the sheets or plates with a liquid solvent, (4) a reservoir for the liquid solvent, (5) means for distilling a portion of pure solvent from the used solvent, and (6) means for returning pure solvent to the reservoir.

The machine is compact and economical to construct and maintain as only a small volume of solvent is needed to obtain effective results.

BRIEF DESCRIPTION OF THE DRAWINGS

The machine of the invention is shown in the attached drawings which constitute a part of this application. In the drawings.

DESCRIPTION OF THE PREFERRED EMBODIMENTS

Figure 1:
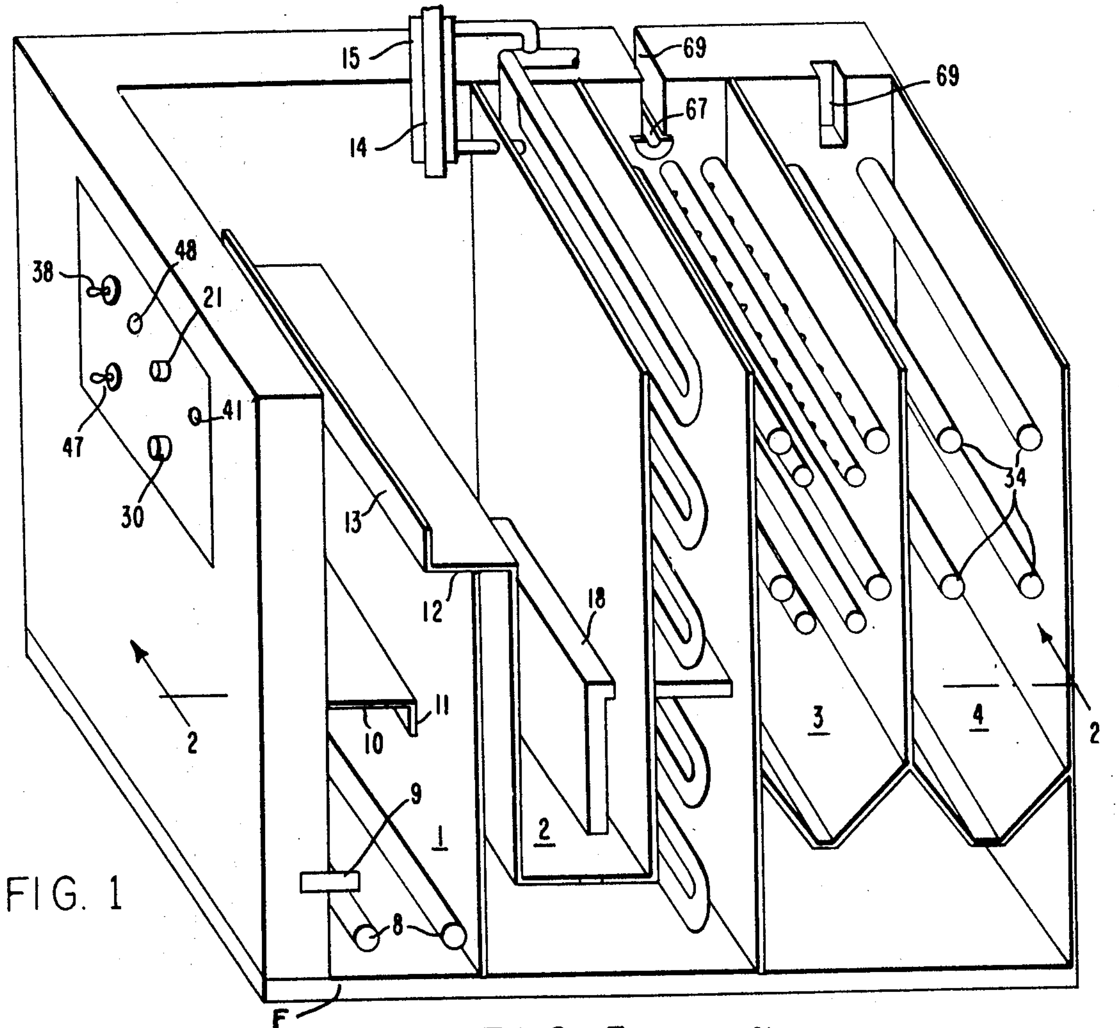
FIG. 1 is an isometric view of the machine with the top and one side removed.

With reference to the drawings wherein the same reference numerals refer to the same parts throughout the several views, the machine comprises a suitable frame or base F which carries or supports four respective chambers.

Chamber 1 constitutes an evaporation or distillation chamber. Adjacent this chamber and connected therewith is reservoir chamber 2 which is provided with means for condensing solvent vapor. Next to the reservoir chamber is an initial plate spray chamber 3 and adjacent said chamber is a final spray washing chamber 4.

Distillation chamber 1 preferably is rectangular in vertical and horizontal cross section. The upper part of this chamber has a head space 5 that interconnects with the upper part of the reservoir chamber. The bottom of the distillation chamber is provided with a delivery port 6 and a drain port 6' through which residues may be removed. Solvent supply conduit 7 is connected to the delivery port. Near the bottom of chamber 1 are electrical heating elements 8 which preferably are mounted in a sidewall of the chamber for removal through the wall. Suitable mounting, sealing and insulating means for the elements are not shown and will be obvious to those skilled in the art of heating liquids. Above heating elements 8 is a bimetallic thermostat 9 which can be similarly mounted through a wall of chamber 1 and provided with seals (not shown). Above the normal liquid level in chamber 1 and joined to the end and sidewalls thereof is baffle plate 10 having downwardly projecting lip 11. Flush with the bottom wall of headspace 5 is baffle plate 12 which is joined to the sidewalls of the headspace, and has upwardly projecting lip 13. Through the top or cover of headspace 5 there is provided a vapor release port 14. It is surrounded by condenser jacket 15 and preferably the port is open to the atmosphere. The inner wall 16 of chamber 2 serves as a plate condenser being cooled by condenser tubes 17 mounted adjacent said wall. Wall 16 acts as the condenser for the solvent vapor evaporated in chamber 1. In a lower part of condenser wall 16 is conduit 18 leading to chamber 3 the top of which is open to the atmosphere. At the bottom of chamber 2 is exit port 19 connected to conduit 20. Conduit 20 leads to pump 21, which in turn is connected to conduit 22 leading to manifold 23 feeding perforated spray tubes 24 mounted as shown through and extending between the sidewalls of chamber 3. The bottom of chamber 3 slopes to exit port 25 which is connected to conduit 26. This conduit is provided with a check valve 27 which permits flow from chamber 3 to chamber 1 and prevents flow in the reverse direction. Near the bottom of chamber 3 is exit port 28 connected by conduit 29 to pump 30 which, in turn, is connected to conduit 31 leading to manifold 32 feeding perforated spray tubes 33 mounted along each surface of sheet or plate P.

Adjacent chamber 3 is chamber 4 which is open at the top and in which are disposed perforated spray tubes 34 fed from manifold 35. This spraying operation generally will consist of two cycles. The first is a removal-wash cycle and the second a rinsing or cleaning cycle. The solvent, e.g., an aqueous solution is fed from condenser tubes 17 through jacket 15 and thence through conduit 36. At the bottom of chamber 4 is large drain 37 leading to a disposal point.

Figure 5:
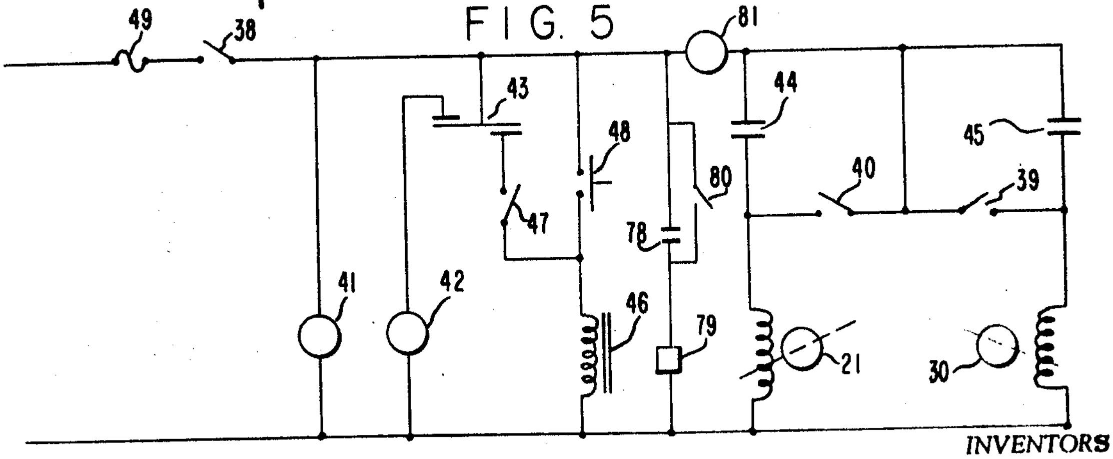
FIG. 5 is a diagram of the electrical control circuit for the spray pumps, for the heating elements.

Referring to FIG. 5, the electrical system operating the pumps comprises two electrical motors (not shown) coupled to the drive shafts of pumps 21 and 30. The motors are made capable of manual operation by means of switches 40 and 39, respectively. The main electrical power to the pumps is supplied through switch 38 which also energized pilot light 41 to signal that the pumping unit is on. Converting the simple manual operation to automatic operation may be done by adding timing motor 42 with associated timing cams 43, 44, and 45 and timing solenoid 46. To start the automatic cycle, a manual-automatic selector switch 47 is inserted between timing cam 43 and timing solenoid 46 and in parallel circuitry with a push-to-start double contacting starting switch 48. Fuse 49 is inserted as a safety device.

Figure 6:
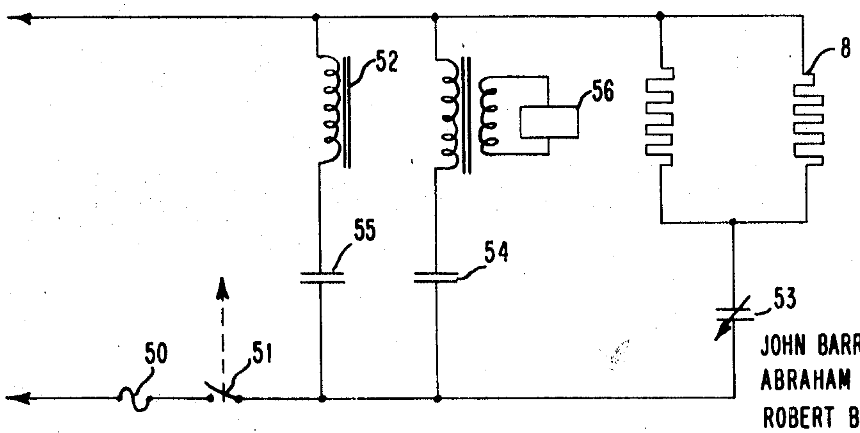
FIG. 6 is a diagram of the spray pump circuit.

The heater circuit is shown in FIG. 6 and consists of heating element 8 receiving power through fuse 50 and on-off switch 51. A high heat alarm relay 52 having contacts 53 and 54 is used with thermoswitch 55 and buzzer 56 to indicate a low solvent condition around the heaters in chamber 1.

Figures 3, 4:
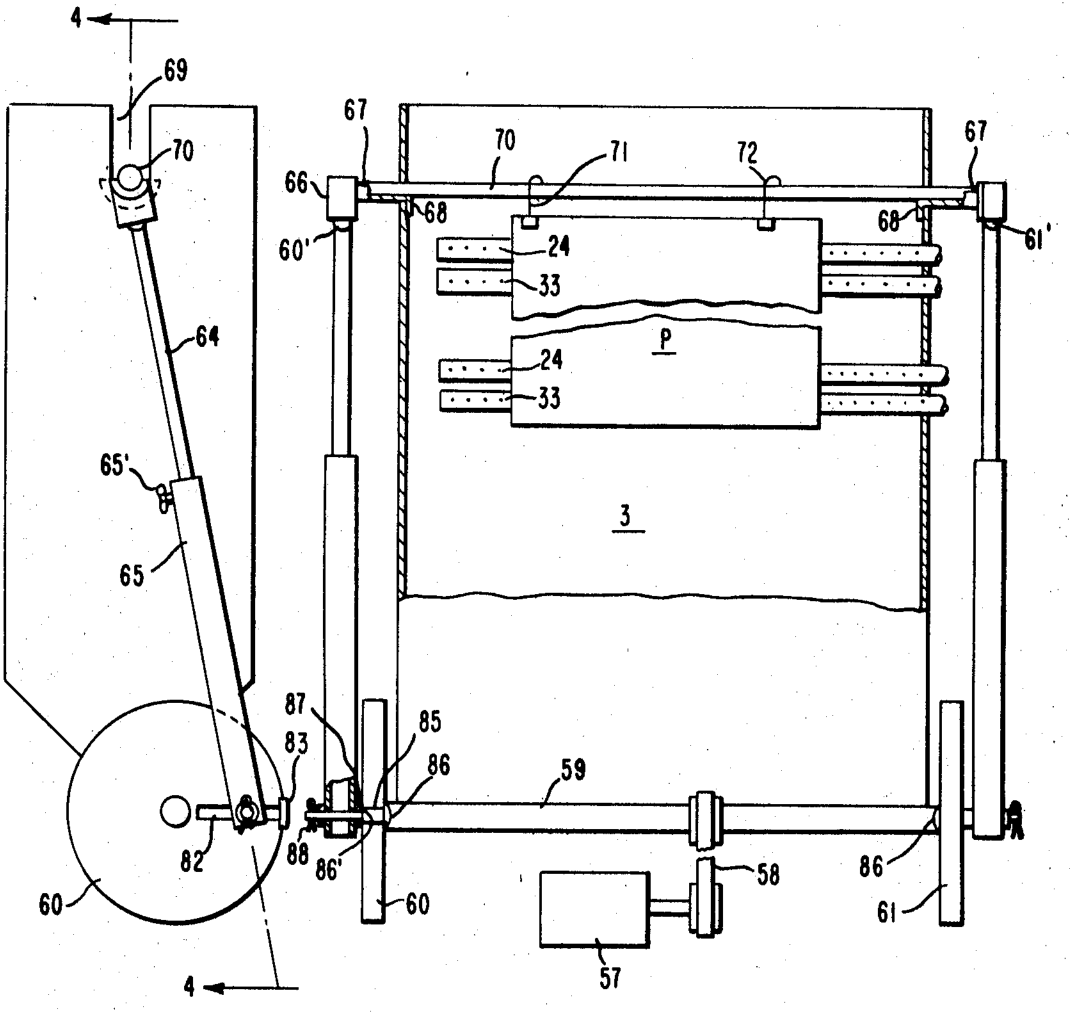
FIG. 3 is a side elevation view of a spray chamber showing a reciprocating mechanism for the sheets or plates suspended in the chamber.
FIG. 4 is a vertical sectional view taken along the line 4—4 of FIG. 3.

Throughout the solvent spraying cycles in chamber 3, the sheet or plate to be developed is supported on a reciprocating bar 70, identified and described more fully below. As is best seen in FIGS. 3 and 4, most of the mechanism for actuating the bar is located outside of chamber 3. The mechanism includes motor 57 and shaft 59 on which is fastened pulley 58. Attached to each end of shaft 59 and rotating therewith are discs 60 and 61 having slots 82 and retaining members 83. Pivotally and eccentrically connected to the respective discs are cylindrical rod 64 and tube 65 fastened by screw 65′. The stroke is also controlled by the length of the slot in discs 60 and 61 and/or the thickness of the retaining member. The rods have ball-shaped upper ends 60′ and 61′ which interfit with a spherical socket in the end yoke 66 of trough-shaped support members 67. The horizontal trough members have depending edges 68 which interfit with the walls of adjacent slots 69 in the upper portions of the sidewalls of chamber 3. A removable rod 70 having spaced clips 71 and 72 that are adapted to grasp and hold the sheet or plate P to be developed to a resist, extends across chamber 3 with its ends resting in trough member 67. The plate to be developed is disposed between the spraying nozzles of chamber 3.

The end of tube 65 interfits with pivot pin 85 having head 86 which fits against one surface of disc 60 or 61. Pin 85 has a shoulder portion 86′ and washer 87 contacts this shoulder. Another washer 87 is provided to press against the other surface of tube 65 and the pivot pin is maintained in place by a suitable fastening means, e.g., cotter pin 88.

Connected to conduit 36 in fluid flow relationship is the surfactant injection means or system. The system is comprised of a venturi tube 73 which converts the pressure head of water into a high fluid velocity at the throat of the tube. The drop in pressure creates a suction which allows surfactant from supply tank 74 to be drawn into the system. Variable orifice 75 which regulates the amount of flow of surfactant, and solenoid operated valve 76 which cycles the surfactant during rinsing are controls in the suction line leading into venturi tube 73. In conduit 36 and upstream of the venturi tube flow, a pressure regulator valve 77 is used to insure uniform pressure.

Integral with the machine is an electrical control system. Generally, the machine and controls are designed to spray the exposed photoresist-coated article with used solvent and then with pure solvent. Part of the used solvent is purified by gravity feeding it into chamber 1 where it is made to boil by the application of heat through electric heaters 8. The vapor is then collected and condensed. The condensate is purified solvent ready to be recycled. After the solvent spray the photoresist plate is moved to chamber 4 where it is supported in a similar manner (not shown) with or without a reciprocating mechanism as for chamber 3, washed with a solvent, e.g., an aqueous solution containing a surfactant, and rinsed with clear water.

In operation of the machine, while the exposed resist-coated article is being subjected to the solvent sprays, the sheet or plate and its supporting means are reciprocated in a vertical direction through the action of a prime mover, motor 57, manually operated.

During transfer of a plate from solvent spray chamber 3 to the cleaning and rinsing spray chamber 4, a timing delay is programmed to permit the transfer of the article attached to support 70 without operation of the spray pipes. Once the plates are suspended in the chambers, timing cam 78 activates the circuit to force a surfactant solution to be drawn into the venturi tube 73. Switch 80 is used to activate the solvent cycle manually.

A pump usable in the system is the Dayton pump driven by a split phase motor, manufactured by Dayton Electric Mfg. Co., Chicago, Illinois. The timing mechanism used to cycle the pumps including timing motor, solenoid and cams may be the Model RC–4 Timer manufactured by Industrial Timer Corp. Co., Parsippany, N.J.

The operation of the developing machine including the initial steps may be described as follows:

The appropriate solvent is introduced through relief port 14 into chamber 2, first filling chamber 2 to the level of conduit 18 as shown by line 37. As additional solvent is added, it flows through conduit 18 into chamber 3 and thence through exit port 25, conduit 26, check valve 27, conduit 7 and delivery port 6 into chamber 1. Addition of solvent is continued until level 38 is reached in chamber 3. The level 38 should be well above exit port 28. As can be seen, level 39 in chamber 1 will be about the same as level 38 in chamber 3, and will cover heaters 8 and thermostat 9.

A plate to be developed is inserted in chamber 3 between the solvent spray nozzles and is held there by an appropriate support rod 70 and clips 71 and 72. The spray developing may be done in one of three modes i.e., (*a*) manual control of each solvent spray, (*b*) semiautomatic programming where one cycle will be automatically carried out after being initiated by a start button and (*c*) an automatic recycling mode where the machine continues to cycle on its own.

Referring to FIG. 5, the manual operating mode of the developing operation is begun by turning on main switch 38 to deliver power for pumps 21 and 30. The spray developing operation is done in two steps, first the article is subjected to a heavy spray through nozzles 33. This spraying cycle begins by closing manual switch 39 to activate pump 30. Pump 30 pulls solvent in from the used solvent reservoir at the bottom of chamber 3, through port 28 and conduit 29 and pumps it out through conduit 31 and spray nozzles 33. From sprays 33 the solvent strikes the plate dissolving most of the soluble material and the used solvent falls back into the used solvent reservoir at the bottom of chamber 3. Part of the used solvent will again be recirculated through pump 30 and part will be regenerated into pure solvent by an evaporation condensation cycle. The solvent regeneration cycle begins by used solvent under gravity flow leaving chamber 3 through port 25 into conduit 26 through check valve 27, conduit 7 and into the chamber 1, through port 6. The used solvent in the bottom of chamber 1 is heated to its boiling point by heaters 8. As it evaporates it rises to the top of the chamber and is condensed by the cooling action of condenser 17 and cold wall 16. The condensed solvent collects on the roof, walls, and baffle 12, and eventually finds its way into the reservoir at the bottom of chamber 2. Baffles 10 and 12 are used to keep the boiling solvent from splashing into the pure solvent of chamber 2. The used solvent is now in a purified state and will be used as the spray for the second spraying of the article.

Figure 2:
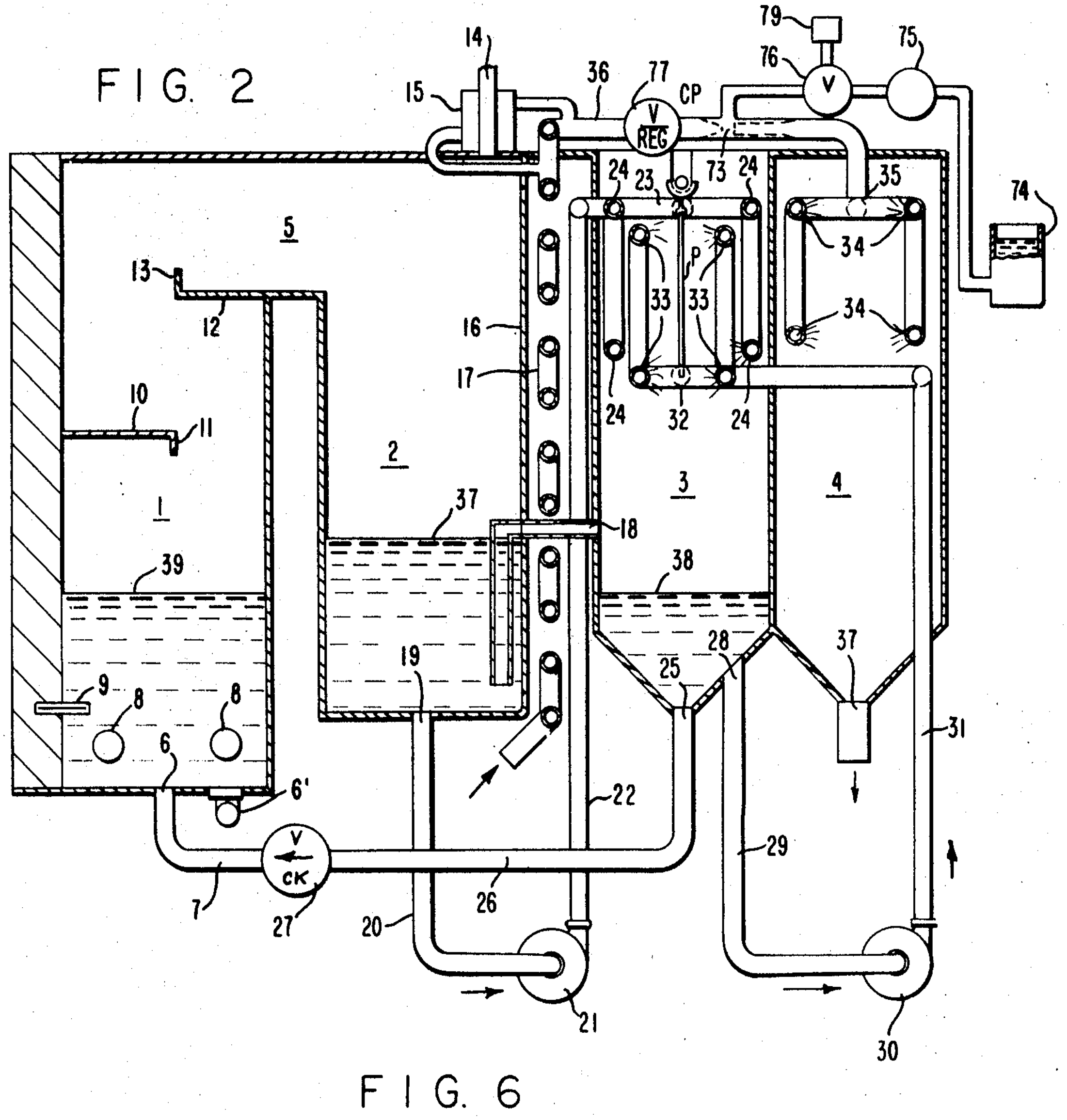
FIG. 2 is a vertical sectional view taken along line 2—2 of FIG. 1, the pumps and associated pipes, sprays and pumps being shown schematically.

As a safety device in the evaporation of the used solvent, a low solvent level alarm is used. Referring to FIG. 2 heaters 8 are mounted at the bottom of chamber 1. Mounted just above the heaters is thermoswitch 9. When the level of the liquid 39 falls below the heaters 8 an increase in temperature next to the thermoswitch occurs activating the thermoswitch setting off an alarm and turning off heaters 8. This can be explained electrically by looking to FIG. 6. During normal operation relay contact 53 is closed to supply power to the heaters and relay contact 54 is open to deactivate the buzzer. Thermoswitch 55 is also open so that relay 52 is deactivated. When the electric heaters become exposed the increase in temperature of the surrounding area activates thermoswitch 55 closing its contacts. This activates relay 52 causing contact 53 to open thereby deactivating the heaters while contact 54 closes to activate buzzer 56. The condition may be remedied by adding more liquid to the system.

Cooling coil 17 is placed against the sidewall of chamber 2 and is cooled by continuously running cold water through it. The cooling effect condenses the evaporated solvent from chamber 1.

When ready for the second spraying which uses this purified solvent, pump 21 is turned on by manual switch 40 and solvent is pulled from the pure solvent reservoir in chamber 2, through port 19 and into conduit 20 to pump 21. Pump 21 forces the pure solvent through conduit 22 and out spray nozzles 24. Spray 24 is fine spray, as compared to the spray from nozzles 33, and being pure solvent it is very effective in completing the final step in developing.

During the solvent spraying cycles the article and its support are reciprocated in a vertical direction in order to help assure complete exposure to the developer and removal of the nonresist material. To position the article between the spraying nozzle so that proper exposure to the sprays is achieved the stroke of the reciprocating action can be adjusted by moving rods 64 and 65 along radial slides 82 and 83 cut into disks 60 and 61. The median position of the reciprocating action of support bar 70 can be raised or lowered by adjusting telescopic rods 64 and 65.

If it is desired to operate the solvent spraying cycle semiautomatically the cycle is initiated by closing switch 38, to supply power and depressing start button 48 to energize the timing motor solenoid 46. See FIG. 5. The timing motor solenoid 46 reverses the timing motor contacts 43 to supply power to the timing motor 42. When the timing motor 42 starts, it drives timing cams 45 and 44. As the timing cams rotate, 45 closes its associated switch to activate pump 30 to supply the first spraying cycle while 44 remains inactive. As the cams continue to rotate 45 deenergizes its associated switch completing the first spraying cycle and cam 44 then closes its associated switch to activate pump 21.

To operate the spray system in the complete automatic mode the manual to automatic switch 47 is closed so that as one cycle ends timing motor contacts 43 switch back to their normal position, as shown. A power route to the timing motor starting solenoid is established from contacts 43, through switch 47 and on to timing motor solenoid 46. Thereafter as one cycle ends it will automatically be initiated again.

After solvent development in chamber 3 the article and its support bar 70 are transferred to chamber 4 where the support bar 70 is placed in grooves 84 and 85 cut into the opposing outside walls of chamber 4. The article is disposed between spray nozzles 34. Two spraying cycles are executed in chamber 4. The first is a spray of water containing a surfactant to help wash away the solvent that remains on the plate. The second is a clean water rinse.

The water supply for this operation is taken as the output from the condensers. The water which may be tap water is piped first through condenser coil 17 where it is used to chill and condense the evaporated solvent in chamber 2. From coil 17 the water flows into coil 15 which surrounds atmosphere vent port 14 and condenses any solvent that attempts to pass to the atmosphere. From coil 15 the water enters conduit 36 where it is to be used in the washing cycles.

The modulating water pressure is smoothed out by pressure regulating valve 77. Once a smooth flow is obtained the water enters the venturi tube 73 where it is throttled causing an increase in water velocity and a decrease in pressure. This decrease in pressure causes a suction and this suction is used to pull surfactant into the water line where it is used for washing. The water then flows to manifold 35 and out through sprays 34.

The washing cycle is initiated after the programmed delay passes during which the article and support bar 70 are moved into chamber 4. Timing cam 78 closes its contacts feeding power to solenoid 79 and valve 76 opens. See FIG. 5. Surfactant solution is drawn out of reservoir 74 through valve 76, through variable orifice 75 and into the throat of the venturi tubes to mix with the flowing water as it finally emerges through sprays 34 onto the article. The washings are let to drain through drain 37. When the programmed rinsing cycle is completed, timing cam 78 deactivates solenoid 79. This closes valve 76 stopping the flow of surfactant solution.

When timing cam 78 completes its rotation and deactivates solenoid 79 the program is complete. Timing motor contacts 43, move to their starting position leaving no power route to the timing motor solenoid 46.

Clear water continues to pass through the venturi tube and flow on to the sprays where the object is given a clear rinse. After the rinse the object is removed as a developed piece. The unit is shut down by turning off the main power switches 38 and 51. In actual practice switch 51 is left on through the machine is not being used to process articles. Switch 51 activates the heaters 8 and maintains the evaporation condensation cycle in purifying the used solvent. Alternatively, the surfactant solution rinse may be carried out by a liquid injection system placed in the pure solvent spraying system and cycled to function with or after the pure solvent spray.

After the machine has been operated for a period of time, a residue collects on the bottom of chamber 1 from the evaporation cycle. If the residue is permitted to build up around the heaters located near the bottom of chamber 1, this will eventually render the heaters ineffective to carry out the evaporation cycle. A convenient way of cleaning out the bottom of chamber 1 is to flood it with water and open drain port 6' to let the water carry the residue out through the drain.

There are many equivalents that may be employed to modify this invention. The device may be made out of various materials such as steel, aluminum, plastic, or glass, and chamber 1 which houses the evaporation operation may be insulated on the outside to increase the efficiency of the heaters. Cooling coil 17 may be disposed in chamber 2 rather than adjacent to it. Cooling coil 17 may be designed as a closed system with a refrigeration stage interposed. This might be necessary to provide proper cooling if the volume of the still is increased beyond the chilling capacity of the tap water or the solvent used requires a lower chilling temperature than the tap water can produce. If condenser 17 is made a closed system, then conduit 36 will have to take water from its own reservoir. The nozzle systems may be modified by varying the type nozzle used, the degree of impingement and the pattern of arrangement. The pattern chosen should complement the reciprocating movement of the article to be developed so that all portions of the article are subjected to the spray. Filters may be placed in fluid conduits at appropriate places, such as before pumps or before spray nozzles. The bimetallic thermostat 19 may be replaced by a combination heater-thermostat which will also sense the liquid level.

The reciprocating motion of the article to be developed may be used in the washing cycles of chamber 4 as well as 3. Furthermore, the techniques of achieving reciprocating action are varied, e.g., rack and pinion or a rotating cam in contact with a spring or gravity-biased activating rod.

The surfactant injection system may be an injection pump or a proportioning pump and the injection may be done either into the wash water or into the pure solvent cycle. The surfactant solution injection system may be made a separate system as opposed to integrating it in another system.

The heating system servicing the still may be a gas heater or steam at appropriate pressure.

In the electrical system, the logic may be sequenced by stepping relays activated by an electrical timer as well as by many other well known mechanisms and circuits.

An advantage of this system is its compact and economic construction. Only a small volume of solvent is needed to obtain effective results and the solvent regeneration system is simple and easy to maintain. The equipment requires no special skill to operate and is economic to maintain.

I claim:

1. A machine for developing resist images on etchable sheets or plates comprising a. a frame support, b. four adjacent chambers carried by said support, said chambers being i. an evaporation chamber for a solvent solution for said sheets or plates, ii. a reservoir chamber having a vapor communication with the evaporation chamber and provided with cooling means for condensing solvent vapors from the evaporation chamber;

iii. an initial spray chamber for receiving latent image-bearing sheets or plates provided with spray means for a solvent for removing nonresist areas of said sheets or plates, and with means for reciprocating said sheets or plates while they are being sprayed; and iv. a final spray chamber for receiving said plates or sheets having means for spraying a surfactant solution onto said sheets or plates;

c. means for conducting solvent from the reservoir to said spray means in said initial spray chamber;

d. means for collecting sprayed solvent in the initial spray chamber and returning part of it to the evaporation chamber;

e. means for recycling part of the solvent in the initial spray chamber to the spray means in said initial chamber;

f. means for metering surfactant solution into the spray means in the final spray chamber; and g. means for removing the used surfactant solution from the final spray chamber.

2. A machine according to claim 1 wherein the chamber is provided with heating means for evaporating solvent therein.